(12) United States Patent
Serban et al.

(10) Patent No.: US 8,608,950 B2
(45) Date of Patent: *Dec. 17, 2013

(54) PROCESS FOR REMOVING METALS FROM RESID

(75) Inventors: Manuela Serban, Glenview, IL (US); Alakananda Bhattacharyya, Glen Ellyn, IL (US); Beckay J. Mezza, Arlington Heights, IL (US); Kurt M. Vanden Bussche, Lake in the Hills, IL (US); Christopher P. Nicholas, Evanston, IL (US); Warren K. Bennion, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 444 days.

This patent is subject to a terminal disclaimer.

(21) Appl. No.: 12/945,765

(22) Filed: Nov. 12, 2010

(65) Prior Publication Data

US 2011/0155635 A1    Jun. 30, 2011

Related U.S. Application Data

(60) Provisional application No. 61/291,295, filed on Dec. 30, 2009.

(51) Int. Cl.
| | | |
|---|---|---|
| C10G 21/06 | (2006.01) | |
| C10G 67/04 | (2006.01) | |
| C10G 29/20 | (2006.01) | |
| C10G 21/20 | (2006.01) | |
| C10G 21/24 | (2006.01) | |
| C10G 21/28 | (2006.01) | |

(52) U.S. Cl.
USPC ........... 208/251 R; 208/87; 208/96; 585/860; 585/864

(58) Field of Classification Search
CPC ........ C10G 21/06; C10G 21/08; C10G 21/12; C10G 21/16; C10G 21/18; C10G 21/20; C10G 21/22; C10G 21/24; C10G 21/28
USPC ........... 208/87, 89, 96, 187, 188, 208 R, 211, 208/236, 237, 238, 251 R, 254 R, 262.1, 208/265, 289, 292, 298, 311; 585/860, 864, 585/865, 867
See application file for complete search history.

(56) References Cited

U.S. PATENT DOCUMENTS

| | | | |
|---|---|---|---|
| 2,981,678 A | | 4/1961 | Buningh |
| 3,652,735 A | * | 3/1972 | Hechenbleikner et al. ... 558/215 |

(Continued)

FOREIGN PATENT DOCUMENTS

| | | | |
|---|---|---|---|
| CN | 1657596 A | 8/2005 | |
| CN | 1847366 A | * 10/2006 | ............. C10G 29/20 |

(Continued)

OTHER PUBLICATIONS

Sandra T. M. Vidal, M. Joana Neiva Correia, M. Matilde Marques, M. Rosinda Ismael & M. Teresa Angelino Reis, Studies on the Use of Ionic Liquids as Potential Extractants of Phenolic Compounds and Metal Ions, Jul. 2004, Separation Science and Technology, vol. 39, Issue 9, pp. 2155-2169.*

(Continued)

*Primary Examiner* — Nina Bhat
*Assistant Examiner* — Jonathan Miller
(74) *Attorney, Agent, or Firm* — Mark Goldberg

(57) ABSTRACT

A process for removing a metal from a resid feed includes contacting the resid feed comprising the metal with a resid-immiscible ionic liquid to produce a resid and resid-immiscible ionic liquid mixture, and separating the mixture to produce a resid effluent having a reduced metal content relative to the resid feed.

5 Claims, 2 Drawing Sheets

(56) References Cited

U.S. PATENT DOCUMENTS

| | | | |
|---|---|---|---|
| 4,376,040 A * | 3/1983 | Sader | 208/180 |
| 4,483,763 A | 11/1984 | Kuk | |
| 4,747,936 A | 5/1988 | Penning | |
| 4,992,210 A | 2/1991 | Naeger | |
| 5,494,572 A * | 2/1996 | Horii et al. | 208/263 |
| 5,817,228 A | 10/1998 | Greaney et al. | |
| 5,961,821 A | 10/1999 | Varadaraj et al. | |
| 6,013,176 A | 1/2000 | Greaney et al. | |
| 6,096,196 A | 8/2000 | Varadaraj et al. | |
| 6,139,723 A | 10/2000 | Pelrine | |
| 6,464,859 B1 | 10/2002 | Duncum et al. | |
| 6,596,914 B2 | 7/2003 | Gore | |
| 6,881,325 B2 | 4/2005 | Morris | |
| 7,001,504 B2 | 2/2006 | Schoonover | |
| 7,019,188 B2 * | 3/2006 | Smith et al. | 585/809 |
| 7,198,712 B2 | 4/2007 | Olivier-Bourbigou | |
| 7,252,756 B2 | 8/2007 | Gong | |
| 7,553,406 B2 | 6/2009 | Wasserscheid | |
| 7,749,377 B2 | 7/2010 | Serban | |
| 7,914,688 B2 | 3/2011 | Anderson et al. | |
| 8,343,336 B2 | 1/2013 | Hamad et al. | |
| 2007/0000809 A1 | 1/2007 | Lin | |
| 2008/0221353 A1 * | 9/2008 | Tsunashima | 564/12 |
| 2008/0245705 A1 | 10/2008 | Siskin | |
| 2009/0101592 A1 | 4/2009 | Anderson et al. | |
| 2009/0288992 A1 * | 11/2009 | Victorovna Likhanova et al. | 208/237 |
| 2010/0051509 A1 * | 3/2010 | Martinez Palou et al. | 208/237 |
| 2010/0243532 A1 | 9/2010 | Myers | |
| 2010/0270211 A1 * | 10/2010 | Wolny | 208/243 |
| 2011/0203972 A1 * | 8/2011 | Gargano et al. | 208/236 |

FOREIGN PATENT DOCUMENTS

| | | | | |
|---|---|---|---|---|
| EP | 1854786 A1 * | 11/2007 | | C07D 213/84 |
| JP | 11241074 A | 9/1999 | | |
| WO | WO 2007138307 A2 * | 12/2007 | | C10F 21/27 |

OTHER PUBLICATIONS

Yi Nie, Chun-Xi Li, Zi-Hao Wang, Extractive Desulfurization of Fuel Oil Using Alkylimidazole and Its Mixture with Dialkylphosphate Ionic Liquids, Jul. 18, 2007, Ind. Eng. Chem. Res., vol. 46, No. 15, pp. 5108-5112.*

U.S. Appl. No. 12/945,253, filed Nov. 12, 2010, Serban et al.
U.S. Appl. No. 12/945,303, filed Nov. 12, 2010, Bhattacharyya et al.
U.S. Appl. No. 12/945,752, filed Nov. 12, 2010, Bhattacharyya et al.
U.S. Appl. No. 12/945,786, filed Nov. 12, 2010, Serban et al.
U.S. Appl. No. 12/945,807, filed Nov. 12, 2010, Serban et al.

Xie, Selective Extraction and Identification of Neutral Nitrogen Compounds Contained in Straight-Run Diesel Feed Using Chloride Based Ionic Liquid, Industrial and Engineering Chemistry Research 47(22) 2008, pp. 8801-8807, 2008 American Chemical Society.

Peng, Extraction of Basic Nitrides from FCC Diesel Using Ionic Liquids at Room Temperature, Petroleum Science and Technology 23:9, 2005, pp. 1023-1031, Publisher: Taylor and Francis.

Fan, Review of Researches and Application of Room Temperature Ionic Liquids in Petroleum Industry,Oilfield Chemistry 24(3) 2007, pp. 283-286, China International Book Trading Corp. (abstract in English).

Eber, Deep Desulfurization of Oil Refinery Streams by Extraction with Ionic Liquids, GreenChem., Jun. 2004, pp. 316-322, The Royal Society of Chemistry 2004.

Wei, Room Temperature Ionic Liquid as a Novel Medium for Liquid/Liquid Extraction of Metal Ions, Analytica Chimica Acta 488 (2003) pp. 183-192, Elsevier.

Visser, Liquid/Liquid Extraction of Metal Ions in Room Temperature Ionic Liquids, Separation Science and Technology 36(5&6), (2001) Marcel Dekker Inc., pp. 785-804.

* cited by examiner

PROCESS FOR REMOVING METALS FROM RESID

CROSS-REFERENCE TO RELATED APPLICATION

This application claims the benefit of U.S. Provisional Application No. 61/291,295 filed Dec. 30, 2009.

FIELD OF THE INVENTION

The present invention relates to processes for removing one or more metals from petroleum resid. More particularly, the invention relates to such processes using an ionic liquid.

BACKGROUND OF THE INVENTION

Petroleum resid is the bottoms or heavy fraction produced by distilling petroleum crudes and may be referred to as atmospheric resid and vacuum resid to indicate the type of distillation. Resid may be converted into transportation fuels such as jet, diesel, and gasoline by a variety of processes. However, the metal content of the resid, e.g., alkali, alkaline earth metals, first transition metals, as well as Al, Sn, Pb, Sb, and the like may poison the catalysts used and cause higher coke production, which can decrease the conversion and/or selectivity of the various processes employed.

Conventionally, the resid metal content may be concentrated in a coke or bottoms product of thermal processes such as coking and visbreaking, which also produce lighter hydrocarbon fractions such as naphtha, diesel. Although the metals are concentrated in the heavier products in these thermal processes, the lighter products may require additional or specialized processing because they contain significantly more metals relative to similar boiling range straight run fractions. Metals in resid may also be removed by adsorption onto solid particles such as catalysts or adsorbents. Such particles may be used in conjunction with resid hydrotreating processes that also reduce the nitrogen and sulfur content of the resid.

Various processes using ionic liquids to remove sulfur and nitrogen compounds from hydrocarbon fractions are known. U.S. Pat. No. 7,001,504 B2 discloses a process for the removal of organosulfur compounds from hydrocarbon materials which includes contacting an ionic liquid with a hydrocarbon material to extract sulfur containing compounds into the ionic liquid. U.S. Pat. No. 7,553,406 B2 discloses a process for removing polarizable impurities from hydrocarbons and mixtures of hydrocarbons using ionic liquids as an extraction medium. U.S. Pat. No. 7,553,406 B2 also discloses that different ionic liquids show different extractive properties for different polarizable compounds.

Liquid/Liquid Extraction of Metal Ions in Room Temperature Ionic Liquids, by Visser, Ann E., et al, SEPARATION SCIENCE AND TECHNOLOGY, 36(5&6), 785-804, (2001), Marcel Dekker, Inc., discloses the use of room temperature ionic liquids, specifically, 1-alkyl-3-methylimidazolium hexafluorophosphate, to separate metal ions from aqueous solutions.

There remains a need in the art for improved processes that reduce the metal content of petroleum resid.

SUMMARY OF THE INVENTION

In an embodiment, the invention is a process for removing a metal from a resid comprising: contacting the resid comprising the metal with a resid-immiscible ionic liquid comprising at least one of an imidazolium ionic liquid, a pyridinium ionic liquid, an ammonium ionic liquid, and a phosphonium ionic liquid to produce a mixture comprising the resid and the resid-immiscible ionic liquid; and separating the mixture to produce a resid effluent and a resid-immiscible ionic liquid effluent comprising the metal.

In another embodiment, the resid-immiscible ionic liquid comprises at least one of 1-butyl-3-methylimidazolium hexafluorophosphate, 1-ethyl-3-methylimidazolium ethyl sulfate, methylimidazolium trifluoroacetate, 1-butyl-3-methylimidazolium bromide, 1-butyl-3-methylimidazolium hydrogen sulfate, pyridinium p-toluene sulfonate, 1-ethyl-3-methylimidazolium trifluoroacetate, 1-ethyl-3-methylimidazolium chloride, tetraethyl-ammonium acetate, tetrabutylphosphonium methanesulfonate, 1-methylimidazolium hydrogen sulfate, and 1-butylpyridinium chloride.

In a further embodiment, the mixture comprises water in an amount less than 10% relative to the amount of resid-immiscible ionic liquid in the mixture on a weight basis; the mixture may be water free.

DETAILED DESCRIPTION OF THE INVENTION

Figure 1:
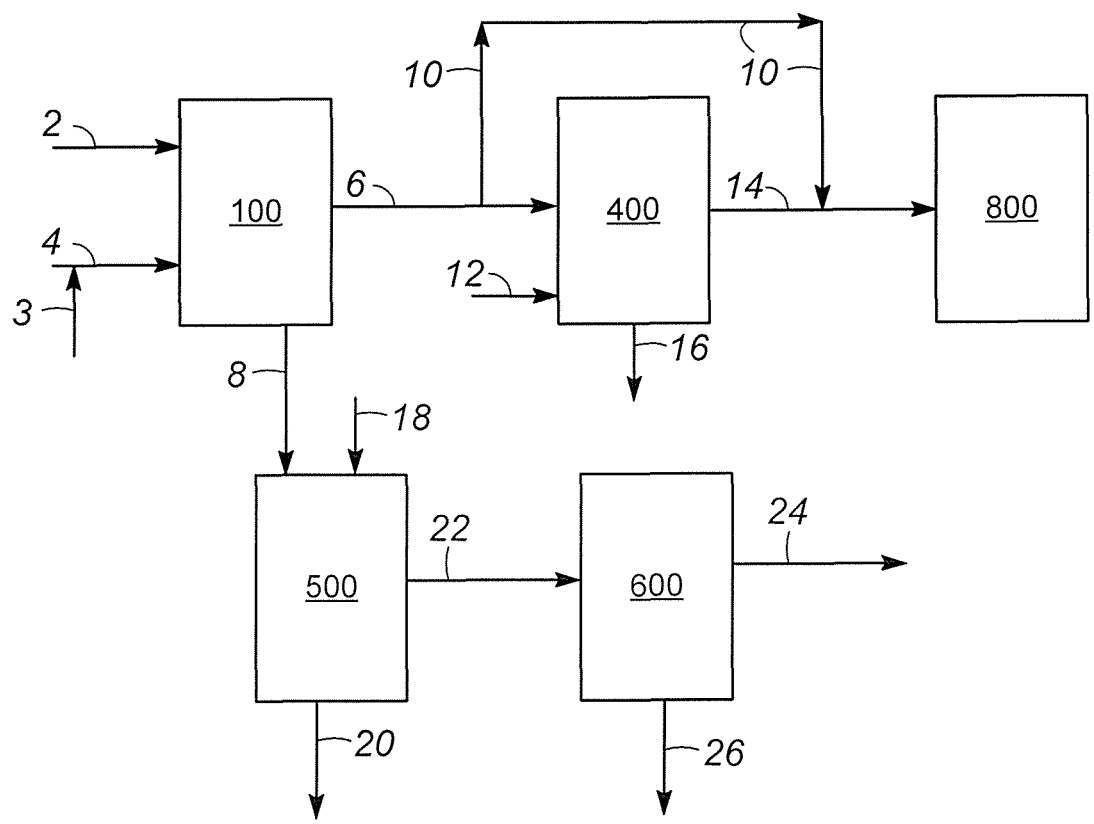
FIG. 1 is a simplified flow scheme illustrating various embodiments of the invention.

In general, the invention may be used to remove one or more metals from resid through use of a resid-immiscible ionic liquid.

The term "resid" as used herein is to be interpreted broadly to receive not only its ordinary meanings as used by those skilled in the art of producing and converting such hydrocarbon fractions, but also in a broad manner to account for the application of our processes to hydrocarbon fractions exhibiting resid-like characteristics. Thus, the term encompass atmospheric resid and vacuum resid as may be produced in a crude fractionation section of an oil refinery and from other processes that may be used to separate crude oil into hydrocarbon fractions. The crude oil to be separated may be any full range crude oil produced from an oil field and/or any full range synthetic crude produced, for example, from tar sand, bitumen, shale oil, and coal. Multiple crude oils may be blended to produce the resid. The resid introduced to processes of this invention may be a blend or mixture of multiple resids.

In general, resid comprises a variety of hydrocarbon components boiling above 600° C. and contains impurities such as sulfur, nitrogen and metals. The sulfur level in resid may range from about 0.5 wt % to about 5 wt %, the nitrogen level may range from about 0.05 wt % to about 3 wt %, and the total metals level may range from about 0.1 ppm-wt to about 2000 ppm-wt. The concentration of nickel in resid may range from about 0.01 ppm-wt to about 200 ppm-wt and the concentration of vanadium may range from about 0.1 ppm-wt to about 1500 ppm-wt. The nitrogen content may be determined using ASTM method D4629-02, Trace Nitrogen in Liquid Petroleum Hydrocarbons by Syringe/Inlet Oxidative Combustion and Chemiluminescence Detection. The sulfur content may be determined using ASTM method D5453-00, Ultraviolet Fluorescence; and the metals content may be determined by UOP389-09, Trace Metals in Oils by Wet Ashing and ICP-OES. Unless otherwise noted, the analytical methods used herein such as ASTM D5453-00 and UOP389-09 are available from ASTM International, 100 Barr Harbor Drive, West Conshohocken, Pa., USA.

Processes according to the invention reduce the metal content of a resid. The resid may comprise a plurality of metals in various amounts. Thus, the invention removes at least a portion of at least one metal from the resid. The invention may remove the same or different amounts of each type of metal, and some metals may not be removed. In an embodiment, the metal comprises at least one of an alkali metal, an alkaline earth metal, a first transition metal, aluminum, tin, lead, and antimony. In another embodiment, the metal comprises at least one first transition metal and the metal may comprise at least one of nickel, vanadium, and iron. In a further embodiment, the metal is selected from the group consisting of an alkali metal, an alkaline earth metal, a first transition metal, aluminum, tin, lead, antimony, and combinations thereof. The metal may be selected from the group consisting of nickel, vanadium, iron, and combinations thereof.

In an embodiment, a metal content of the resid is reduced by at least about 10% on an elemental basis. The invention may remove at least about 40% of a metal from the resid on an elemental basis; and the invention may remove at least about 60% of a metal from the resid on an elemental basis. In another embodiment, an individual metal of the resid is reduced by at least about 10% on an elemental basis in a single metal removal step. An individual metal of the resid may be reduced by at least about 30% on an elemental basis in a single metal removal step; and an individual metal of the resid may be reduced by at least about 50% on an elemental basis in a single metal removal step. In a further embodiment, the invention removes at least about 30% of the nickel and vanadium from the resid on a combined weight basis; and the invention may remove at least about 50% of the nickel and vanadium from the resid on a combined weight basis. For example, the invention removes 40% of the nickel and vanadium from the resid on a combined weight basis if the resid feed contains 80 ppm-wt nickel and 120 ppm-wt vanadium and the resid effluent contains 20 ppm-wt nickel and 100 ppm-wt vanadium. The metal removed may be part of a hydrocarbon molecule or complexed with a hydrocarbon molecule.

One or more ionic liquids may be used to extract one or more metals from resid. Generally, ionic liquids are non-aqueous, organic salts composed of ions where the positive ion is charge balanced with negative ion. These materials have low melting points, often below 100° C., undetectable vapor pressure and good chemical and thermal stability. The cationic charge of the salt is localized over hetero atoms, such as nitrogen, phosphorous, sulfur, arsenic, boron, antimony, and aluminum, and the anions may be any inorganic, organic, or organometallic species.

Ionic liquids suitable for use in the instant invention are resid-immiscible ionic liquids. As used herein the term "resid-immiscible ionic liquid" means the ionic liquid is capable of forming a separate phase from resid under operating conditions of the process. Ionic liquids that are miscible with resid at the process conditions will be completely soluble with the resid; therefore, no phase separation would be feasible. Thus, resid-immiscible ionic liquids may be insoluble with or partially soluble with resid under operating conditions. An ionic liquid capable of forming a separate phase from the resid under the operating conditions is considered to be resid-immiscible. Ionic liquids according to the invention may be insoluble, partially soluble, or completely soluble (miscible) with water.

In an embodiment, the resid-immiscible ionic liquid comprises at least one of an imidazolium ionic liquid, a pyridinium ionic liquid, an ammonium ionic liquid, and a phosphonium ionic liquid. In another embodiment, the resid-immiscible ionic liquid is selected from the group consisting of imidazolium ionic liquids, pyridinium ionic liquids, ammonium ionic liquids, phosphonium ionic liquids and combinations thereof. Imidazolium, pyridinium and ammonium ionic liquids have a cation comprising at least one nitrogen atom. Phosphonium ionic liquids have a cation comprising at least one phosphorus atom. In an embodiment, the resid-immiscible ionic liquid comprises at least one of 1-butyl-3-methylimidazolium hexafluorophosphate, 1-ethyl-3-methylimidazolium ethyl sulfate, methylimidazolium trifluoroacetate, 1-butyl-3-methylimidazolium bromide, 1-butyl-3-methylimidazolium hydrogen sulfate, pyridinium p-toluene sulfonate, 1-ethyl-3-methylimidazolium trifluoroacetate, 1-ethyl-3-methylimidazolium chloride, tetraethyl-ammonium acetate, tetrabutylphosphonium methanesulfonate, 1-methylimidazolium hydrogen sulfate, and 1-butylpyridinium chloride. The resid-immiscible ionic liquid may be selected from the group consisting of 1-butyl-3-methylimidazolium hexafluorophosphate, 1-ethyl-3-methylimidazolium ethyl sulfate, methylimidazolium trifluoroacetate, 1-butyl-3-methylimidazolium bromide, 1-butyl-3-methylimidazolium hydrogen sulfate, pyridinium p-toluene sulfonate, 1-ethyl-3-methylimidazolium trifluoroacetate, 1-ethyl-3-methylimidazolium chloride, tetraethyl-ammonium acetate, tetrabutylphosphonium methanesulfonate, 1-methylimidazolium hydrogen sulfate, 1-butylpyridinium chloride, and combinations thereof.

In an embodiment, the invention is a process for removing a metal from resid comprising a contacting step and a separating step. In the contacting step, the resid comprising the metal and a resid-immiscible ionic liquid are contacted or mixed. The contacting may facilitate transfer or extraction of the one or more metals from the resid to the ionic liquid. Although a resid-immiscible ionic liquid that is partially soluble in resid may facilitate transfer of the metal from the resid to the ionic liquid, partial solubility is not required. Insoluble resid/ionic liquid mixtures may have sufficient interfacial surface area between the resid and ionic liquid to be useful. In the separation step, the mixture of resid and ionic liquid settles or forms two phases, a resid phase and an ionic liquid phase, which are separated to produce a resid-immiscible ionic liquid effluent comprising the metal and a resid effluent.

The process may be conducted in various equipment which are well known in the art and are suitable for batch or continuous operation. For example, in a small scale form of the invention, resid and a resid-immiscible ionic liquid may be mixed in a beaker, flask, or other vessel, e.g. by stirring, shaking, use of a mixer, or a magnetic stirrer. The mixing or agitation is stopped and the mixture forms a resid phase and an ionic liquid phase which can be separated, for example, by decanting or use of a pipette to produce a resid effluent having a lower metal content relative to the resid. The process also produces a resid-immiscible ionic liquid effluent comprising the metal.

The contacting and separating steps may be repeated for example when the metal content of the resid effluent is to be reduced further to obtain a desired metal level in the ultimate resid product stream from the process. Each set, group, or pair of contacting and separating steps may be referred to as a metal removal step. Thus, the invention encompasses single and multiple metal removal steps. A metal removal zone may be used to perform a metal removal step. As used herein, the term "zone" can refer to one or more equipment items and/or one or more sub-zones. Equipment items may include, for example, one or more vessels, heaters, separators, exchangers, conduits, pumps, compressors, and controllers. Additionally, an equipment item can further include one or more zones or sub-zones. The metal removal process or step may be conducted in a similar manner and with similar equipment as is used to conduct other liquid-liquid wash and extraction operations. Suitable equipment includes, for example, columns with: trays, packing, rotating discs or plates, and static mixers. Pulse columns and mixing/settling tanks may also be used.

Figure 2A:
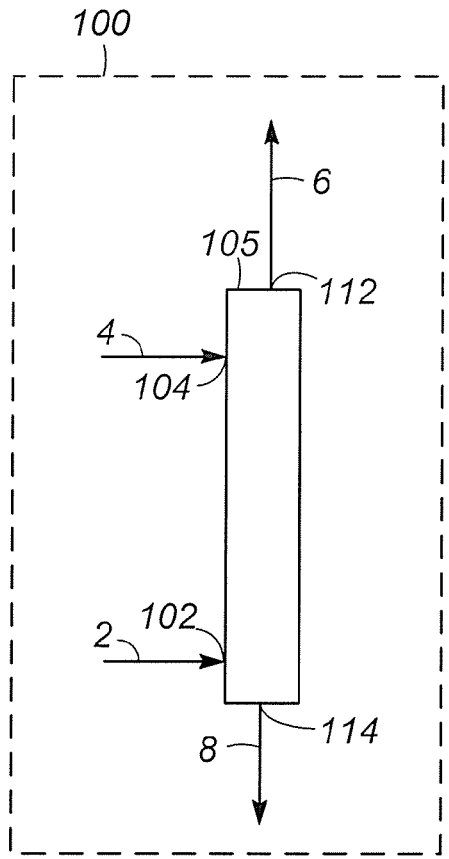
FIGS. 2A and 2B are simplified flow schemes illustrating different embodiments of an extraction zone of the invention.

FIG. 2A illustrates an embodiment of the invention which may be practiced in metal removal or extraction zone 100 that comprises a multi-stage, counter-current extraction column 105 wherein resid and resid-immiscible ionic liquid are contacted and separated. The resid or resid feed stream 2 enters extraction column 105 through resid feed inlet 102 and lean ionic liquid stream 4 enters extraction column 105 through ionic liquid inlet 104. In the Figures, reference numerals of the streams and the lines or conduits in which they flow are the same. Resid feed inlet 102 is located below ionic liquid inlet 104. The resid effluent passes through resid effluent outlet 112 in an upper portion of extraction column 105 to resid effluent conduit 6. The resid-immiscible ionic liquid effluent including the metals removed from the resid feed passes through ionic liquid effluent outlet 114 in a lower portion of extraction column 105 to ionic liquid effluent conduit 8.

Consistent with common terms of art, the ionic liquid introduced to the metal removal step may be referred to as a "lean ionic liquid" generally meaning a resid-immiscible ionic liquid that is not saturated with one or more extracted metals. Lean ionic liquid may include one or both of fresh and regenerated ionic liquid and is suitable for accepting or extracting metal from the resid feed. Likewise, the ionic liquid effluent may be referred to as "rich ionic liquid", which generally means a resid-immiscible ionic liquid effluent produced by a metal removal step or process or otherwise including a greater amount of extracted metals than the amount of extracted metals included in the lean ionic liquid. A rich ionic liquid may require regeneration or dilution, e.g. with fresh ionic liquid, before recycling the rich ionic liquid to the same or another metal removal step of the process.

Figure 2B:
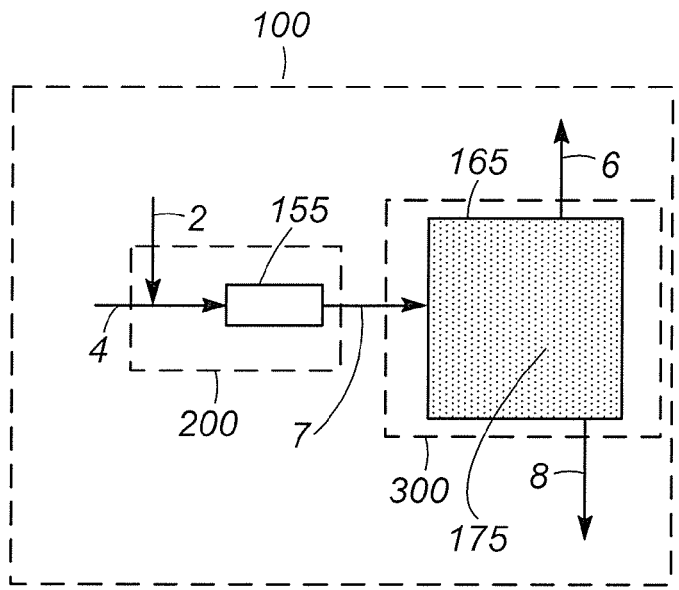

FIG. 2B illustrates another embodiment of metal removal washing zone 100 that comprises a contacting zone 200 and a separation zone 300. In this embodiment, lean ionic liquid stream 4 and resid feed stream 2 are introduced into the contacting zone 200 and mixed by introducing resid feed stream 2 into the flowing lean ionic liquid stream 4 and passing the combined streams through static in-line mixer 155. Static in-line mixers are well known in the art and may include a conduit with fixed internals such as baffles, fins, and channels that mix the fluid as it flows through the conduit. In other embodiments, not illustrated, lean ionic liquid stream 4 may be introduced into resid feed stream 2, or the lean ionic liquid stream 4 and resid feed stream may be combined such as through a "Y" conduit. In another embodiment, lean ionic liquid stream 4 and resid feed stream 2 are separately introduced into the static in-line mixer 155. In other embodiments, the streams may be mixed by any method well know in the art including stirred tank and blending operations. The mixture comprising resid and ionic liquid is transferred to separation zone 300 via transfer conduit 7. Separation zone 300 comprises separation vessel 165 wherein the two phases are allowed to separate into a rich ionic liquid phase which is withdrawn from a lower portion of separation vessel 165 via ionic liquid effluent conduit 8 and the resid phase is withdrawn from an upper portion of separation vessel 165 via resid effluent conduit 6. Separation vessel 165 may comprise a boot, not illustrated, from which rich ionic liquid is withdrawn via conduit 8.

Separation vessel 165 may contain a solid media 175 and/or other coalescing devices which facilitate the phase separation. In other embodiments the separation zone 300 may comprise multiple vessels which may be arranged in series, parallel, or a combination thereof. The separation vessels may be of any shape and configuration to facilitate the separation, collection, and removal of the two phases. In a further embodiment, metal removal zone 100 may include a single vessel wherein lean ionic liquid stream 4 and resid feed stream 2 are mixed, then remain in the vessel to settle into the resid effluent and rich ionic liquid phases. In an embodiment the process comprises at least two metal removal steps. For example, the resid effluent from one metal removal step may be passed directly as the resid feed to a second metal removal step. In another embodiment, the resid effluent from one metal removal step may be treated or processed before being introduced as the resid feed to the second metal removal step. There is no requirement that each metal removal zone comprises the same type of equipment. Different equipment and conditions may be used in different metal removal zones.

The metal removal step may be conducted under metal removal conditions including temperatures and pressures sufficient to keep the resid-immiscible ionic liquid and resid feeds and effluents as liquids. For example, the metal removal step temperature may range between about 10° C. and less than the decomposition temperature of the ionic liquid, usually less than about 300° C.; and the pressure may range between about atmospheric pressure and about 700 kPa(g). When the resid-immiscible ionic liquid comprises more than one ionic liquid component, the decomposition temperature of the ionic liquid is the lowest temperature at which any of the ionic liquid components decompose. The metal removal step may be conducted at a uniform temperature and pressure or the contacting and separating steps of the metal removal step may be operated at different temperatures and/or pressures. In an embodiment, the contacting step is conducted at a first temperature, and the separating step is conducted at a temperature at least 5° C. lower than the first temperature. In a non limiting example the first temperature is about 80° C. Such temperature differences may facilitate separation of the resid and ionic liquid phases.

The above and other metal removal step conditions such as the contacting or mixing time, the separation or settling time, and the ratio of resid feed to resid-immiscible ionic liquid (lean ionic liquid) may vary greatly based, for example, on the specific ionic liquid or liquids employed, the nature of the resid feed, the metal content of the resid feed, the degree of metal removal required, the number of metal removal steps employed, and the specific equipment used. In general it is expected that contacting time may range from less than one minute to about two hours; settling time may range from about one minute to about eight hours; and the weight ratio of resid feed to lean ionic liquid introduced to the metal removal step may range from 1:10,000 to 10,000:1. In an embodiment, the weight ratio of resid feed to lean ionic liquid may range from about 1:1,000 to about 1,000:1; and the weight ratio of resid feed to lean ionic liquid may range from about 1:100 to about 100:1. In an embodiment the weight of resid is greater than the weight of ionic liquid introduced to the metal removal step. The degree of phase separation between the resid and ionic liquid phases is another factor to consider as it affects recovery of the ionic liquid and resid. The degree of metal removed and the recovery of the resid and ionic liquids may be affected differently by the nature of the resid feed, the specific ionic liquid or liquids, the equipment, and the metal removal conditions such as those discussed above.

The amount of water present in the resid/resid-immiscible ionic liquid mixture during the metal removal step may also affect the amount of metal removed and/or the degree of phase separation, i.e. recovery of the resid and ionic liquid. In an embodiment, the resid/resid-immiscible ionic liquid mixture has a water content of less than about 10% relative to the weight of the ionic liquid. In another embodiment, the water content of the resid/resid-immiscible ionic liquid mixture is less than about 5% relative to the weight of the ionic liquid; and the water content of the resid/resid-immiscible ionic liquid mixture may be less than about 2% relative to the weight of the ionic liquid. In a further embodiment, the resid/resid-immiscible ionic liquid mixture is water free, i.e. the mixture does not contain water.

FIG. 1 is a flow scheme illustrating various embodiments of the invention and some of the optional and/or alternate steps and apparatus encompassed by the invention. Resid stream 2 and resid-immiscible ionic liquid stream 4 are introduced to and contacted and separated in metal removal zone 100 to produce resid-immiscible ionic liquid effluent stream 8 and resid effluent stream 6 as described above. The ionic liquid stream 4 may be comprised of fresh ionic liquid stream 3 and/or one or more ionic liquid streams which are recycled in the process as described below. In an embodiment, a portion or all of resid effluent stream 6 is passed via conduit 10 to a hydrocarbon conversion zone 800. Hydrocarbon conversion zone 800 may, for example, comprise at least one of a deasphalting, visbreaking, hydrocracking, and coking process which are well known in the art.

An optional resid washing step may be used, for example, to recover ionic liquid that is entrained or otherwise remains in the resid effluent stream by using water to wash or extract the ionic liquid from the resid effluent. In this embodiment, a portion or all of resid effluent stream 6 (as feed) and a water stream 12 (as solvent) are introduced to resid washing zone 400. The resid effluent and water streams introduced to resid washing zone 400 are mixed and separated to produce a washed resid stream 14 and a spent water stream 16, which comprises the ionic liquid. The resid washing step may be conducted in a similar manner and with similar equipment as used to conduct other liquid-liquid wash and extraction operations as discussed above. Various resid washing step equipment and conditions such as temperature, pressure, times, and solvent to feed ratio may be the same as or different from the metal removal zone equipment and conditions. In general, the resid washing step conditions will fall within the same ranges as given above for the metal removal step conditions. A portion or all of the washed resid stream 14 may be passed to hydrocarbon conversion zone 800.

An optional ionic liquid regeneration step may be used, for example, to regenerate the ionic liquid by removing the metal from the ionic liquid, i.e. reducing the metal content of the rich ionic liquid. In an embodiment, a portion or all of resid-immiscible ionic liquid effluent stream 8 (as feed) comprising the metal and a regeneration solvent stream 18 are introduced to ionic liquid regeneration zone 500. The resid-immiscible ionic liquid effluent and regeneration solvent streams are mixed and separated to produce an extract stream 20 comprising the metal, and a regenerated ionic liquid stream 22. The ionic liquid regeneration step may be conducted in a similar manner and with similar equipment as used to conduct other liquid-liquid wash and extraction operations as discussed above. Various ionic liquid regeneration step conditions such as temperature, pressure, times, and solvent to feed may be the same as or different from the metal removal conditions. In general, the ionic liquid regeneration step conditions will fall within the same ranges as given above for the metal removal step conditions.

In an embodiment, the regeneration solvent stream 18 comprises a hydrocarbon fraction lighter than resid and which is immiscible with the resid-immiscible ionic liquid. The lighter hydrocarbon fraction may consist of a single hydrocarbon compound or may comprise a mixture of hydrocarbons. In an embodiment, the lighter hydrocarbon fraction comprises at least one of a naphtha, gasoline, diesel, light cycle oil (LCO), and light coker gas oil (LCGO) hydrocarbon fraction. The lighter hydrocarbon fraction may comprise straight run fractions and/or products from conversion processes such as hydrocracking, hydrotreating, fluid catalytic cracking (FCC), reforming, coking, and visbreaking. In this embodiment, extract stream 20 comprises the lighter hydrocarbon regeneration solvent and the metal. In another embodiment, the regeneration solvent stream 18 comprises water and the ionic liquid regeneration step produces extract stream 20 comprising the metal and regenerated resid-immiscible ionic liquid 22 comprising water and the ionic liquid. In an embodiment wherein regeneration solvent stream 18 comprises water, a portion or all of spent water stream 16 may provide a portion or all of regeneration solvent stream 18. Regardless of whether regeneration solvent stream 18 comprises a lighter hydrocarbon fraction or water, a portion or all of regenerated resid-immiscible ionic liquid stream 22 may be recycled to the metal removal step via a conduit not shown consistent with other operating conditions of the process. For example, a constraint on the water content of the resid-immiscible ionic liquid stream 4 or ionic liquid/resid mixture in metal removal zone 100 may be met by controlling the proportion and water content of fresh and recycled ionic liquid streams.

Optional ionic liquid drying step is illustrated by drying zone 600. The ionic liquid drying step may be employed to reduce the water content of one or more of the streams comprising ionic liquid to control the water content of the metal removal step as described above. In the embodiment of FIG. 1, a portion or all of regenerated resid-immiscible ionic liquid stream 22 is introduced to drying zone 600. Although not shown, other streams comprising ionic liquid such as the fresh ionic liquid stream 3, resid-immiscible ionic liquid effluent stream 8, and spent water stream 16, may also be dried in any combination in drying zone 600. To dry the ionic liquid stream or streams, water may be removed by one or more various well known methods including distillation, flash distillation, and using a dry inert gas to strip water. Generally, the drying temperature may range from about 100° C. to less than the decomposition temperature of the ionic liquid, usually less than about 300° C. The pressure may range from about 35 kPa(g) to about 250 kPa(g). The drying step produces a dried resid-immiscible ionic liquid stream 24 and a drying zone water effluent stream 26. Although not illustrated, a portion or all of dried resid-immiscible ionic liquid stream 24 may be recycled or passed to provide all or a portion of the resid-immiscible ionic liquid introduced to metal removal zone 100. A portion or all of drying zone water effluent stream 26 may be recycled or passed to provide all or a portion of the water introduced into resid washing zone 400 and/or ionic liquid regeneration zone 500.

Unless otherwise stated, the exact connection point of various inlet and effluent streams within the zones is not essential to the invention. For example, it is well known in the art that a stream to a distillation zone may be sent directly to the column, or the stream may first be sent to other equipment within the zone such as heat exchangers, to adjust temperature, and/or pumps to adjust the pressure. Likewise, streams entering and leaving metal removal, washing, and regeneration zones may pass through ancillary equipment such as heat exchanges within the zones. Streams, including recycle streams, introduced to washing or extraction zones may be introduced individually or combined prior to or within such zones.

The invention encompasses a variety of flow scheme embodiments including optional destinations of streams, splitting streams to send the same composition, i.e. aliquot portions, to more than one destination, and recycling various streams within the process. Examples include: various streams comprising ionic liquid and water may be dried and/or passed to other zones to provide all or a portion of the water and/or ionic liquid required by the destination zone. The various process steps may be operated continuously and/or intermittently as needed for a given embodiment e.g. based on the quantities and properties of the streams to be processed in such steps. As discussed above the invention encompasses multiple metal removal steps, which may be performed in parallel, sequentially, or a combination thereof. Multiple metal removal steps may be performed within the same metal removal zone and/or multiple metal removal zones may be employed with or without intervening washing, regeneration and/or drying zones.

EXAMPLES

The examples are presented to further illustrate some aspects and benefits of the invention and are not to be considered as limiting the scope of the invention.

Example 1

A commercial sample of a vacuum resid with the properties listed in Table 1 was obtained for use a feed stream. The nitrogen content was determined by ASTM Method D4629-02, Trace Nitrogen in Liquid Petroleum Hydrocarbons by Syringe/Inlet Oxidative Combustion and Chemiluminescence Detection. The sulfur content was determined by ASTM Method D5453-00, Ultraviolet Fluorescence. The metals content was determined by UOP389-09, Trace Metals in Oils by Wet Ashing and ICP-OES.

TABLE 1

| | |
|---|---|
| Sulfur, wt % | 4.0 |
| Nitrogen, ppm-wt | 6,000 |
| Nickel, ppm-wt | 68 |
| Vanadium, ppm-wt | 220 |
| Iron, ppm-wt | 15 |
| API | 5.9 |

Examples 2-10

The resid of Example 1 and the ionic liquid listed in Table 2 were mixed overnight in the ratios given in Table 2 at 150° C. using a digital magnetic stirrer hot plate. After mixing was stopped, the samples were held static at 80° C. for 30 minutes then a sample of the resid phase (resid effluent) was removed with a pipette and analyzed for metals. The results are compared in Table 2 where the amounts of metal removed from the resid are reported as a percentage on an elemental basis. In Table 2 a result of zero ("0") means none of that metal was removed while "NA" means the sample was not analyzed.

TABLE 2

| Example | Ionic Liquid (IL) | Resid to IL weight ratio | Vanadium removed, % | Nickel removed, % | Iron removed, % |
|---|---|---|---|---|---|
| 2 | 1-butyl-3-methylimidazolium hexafluorophosphate | 1:1 | 40 | 34 | 0 |
| 3 | 1-ethyl-3-methylimidazolium chloride | 1:0.5 | 0 | 0 | 0 |
| 4 | 1-ethyl-3-methylimidazolium ethyl sulfate | 1:1 | 23 | 24 | 0 |
| 5 | tetraethyl-ammonium acetate | 1:0.5 | 0 | 0 | 0 |
| 6 | pyridinium trifluoro acetate | 1:0.5 | 0 | 0 | 90 |
| 7 | 1-methylimidazolium trifluoroacetate | 1:0.5 | 52 | 51 | 45 |
| 8 | 1-butyl-3-methylimidazolium bromide | 1:0.5 | 11 | 10 | 27 |
| 9 | 1-butyl-3-methylimidazolium hydrogen sulfate | 1:1 | 0 | 0 | 21 |
| 10 | pyridinium p-toluene sulfonate | 1:1 | 36 | 35 | NA |

Examples 11-16

The resid of Example 1 and the ionic liquid listed in Table 3 were mixed for 2 hours at 120° C. in a weight ratio resid to ionic liquid of 2:1 using an automated mixing device with an overhead impeller. After mixing was stopped, the samples were centrifuged at 300 rpm for 30 minutes then a sample of the resid phase (resid effluent) was removed with a pipette and analyzed for metals. The results are compared in Table 3 where the amounts of metal removed from the resid are reported as a percentage on an elemental basis. In Table 3 a result of zero ("0") means none of that metal was removed.

TABLE 3

| Example | Ionic Liquid (IL) | Vanadium removed, % | Nickel removed, % |
|---|---|---|---|
| 11 | 1-ethyl-3-methylimidazolium trifluoroacetate | 21 | 21 |
| 12 | 1-ethyl-3-methylimidazolium chloride | 22 | 0 |
| 13 | tetraethyl-ammonium acetate | 19 | 1 |
| 14 | tetrabutylphosphonium methanesulfonate | 26 | 20 |
| 15 | 1-methylimidazolium hydrogen sulfate | 24 | 0 |
| 16 | 1-butylpyridinium chloride | 20 | 8 |

Examples 2-16 illustrate that a resid-immiscible ionic liquid comprising at least one of an imidazolium ionic liquid, a pyridinium ionic liquid, an ammonium ionic liquid, and a phosphonium ionic liquid removes metal, e.g. at least one of vanadium, nickel, and iron from resid. The results also demonstrate the unpredictable nature of this art as the results vary significantly between the metals, the groups of ionic liquids, and within a group of similar ionic liquids.

The invention claimed is:

1. A process for removing a metal from a resid comprising:
   (a) contacting the resid comprising the metal with a resid-immiscible ionic liquid to produce a mixture comprising the resid and the resid-immiscible ionic liquid, the resid-immiscible ionic liquid comprising at least one of an imidazolium ionic liquid, a pyridinium ionic liquid, an ammonium ionic liquid, and a phosphonium ionic liquid; and
   (b) separating the mixture to produce a resid effluent and a resid-immiscible ionic liquid effluent, the resid-immiscible ionic liquid effluent comprising the metal;
   wherein the resid-immiscible ionic liquid comprises at least one of 1-butyl-3-methylimidazolium hexafluorophosphate, 1-ethyl-3-methylimidazolium ethyl sulfate, methylimidazolium trifluoroacetate, 1-butyl-3-methylimidazolium bromide, 1-butyl-3-methylimidazolium hydrogen sulfate, pyridinium p-toluene sulfonate, 1-ethyl-3-methylimidazolium trifluoroacetate, 1-ethyl-3-methylimidazolium chloride, tetraethyl-ammonium acetate, tetrabutylphosphonium methanesulfonate, 1-methylimidazolium hydrogen sulfate, and 1-butylpyridinium chloride; and
   wherein the metal content of the resid is reduced by at least 10-60% on an elemental basis;
   wherein the resid effluent comprises resid-immiscible ionic liquid, the process further comprising washing at least a portion of the resid effluent with water to produce a washed resid stream and a spent water stream, the spent water stream comprising the resid-immiscible ionic liquid; wherein at least a portion of the spent water stream is at least a portion of the regeneration solvent;
   wherein the regeneration solvent comprises water and the regenerated resid-immiscible ionic liquid stream comprises water and wherein the process further comprises contacting the resid-immiscible ionic liquid effluent with a regeneration solvent and separating the resid-immiscible ionic liquid effluent from the regeneration solvent to produce an extract stream comprising the metal and a regenerated resid-immiscible ionic liquid stream.

2. The process of claim 1 further comprising drying at least a portion of at least one of the regenerated resid-immiscible ionic liquid stream, and the spent water stream to produce a dried resid-immiscible ionic liquid stream.

3. The process of claim 2 further comprising recycling at least a portion of the dried resid-immiscible ionic liquid stream to the metal removal contacting step.

4. A process for removing a metal from a resid comprising:
   (a) contacting the resid comprising the metal with a resid-immiscible ionic liquid to produce a mixture comprising the resid, and the resid-immiscible ionic liquid, the resid-immiscible ionic liquid comprising at least one of an imidazolium ionic liquid, a pyridinium ionic liquid, an ammonium ionic liquid, and a phosphonium ionic liquid;
   (b) separating the mixture to produce a resid effluent and a resid-immiscible ionic liquid effluent, the resid-immiscible ionic liquid effluent comprising the metal; and
   at least one of:
   (c) washing at least a portion of the resid effluent with water to produce a washed resid stream and a spent water stream;
   (d) contacting the resid-immiscible ionic liquid effluent with a regeneration solvent and separating the resid-immiscible ionic liquid effluent from the regeneration solvent to produce an extract stream comprising the metal and a regenerated resid-immiscible ionic liquid stream; and
   (e) drying at least a portion of at least one of the resid-immiscible ionic liquid effluent, the spent water stream, and the regenerated resid-immiscible ionic liquid stream to produce a dried resid-immiscible ionic liquid stream.

5. The process of claim 4 further comprising recycling at least a portion of at least one of the resid-immiscible ionic liquid effluent, the spent water stream, the regenerated resid-immiscible ionic liquid stream, and the dried resid-immiscible ionic liquid stream to the metal removal contacting step.

* * * * *